(12) United States Patent
Takikawa (10) Patent No.: US 12,458,432 B2
(45) Date of Patent: Nov. 4, 2025

(54) SURGICAL INSTRUMENT FOR SURGICAL ASSIST ROBOT

(71) Applicant: RIVERFIELD INC., Tokyo (JP)

(72) Inventor: Kyohei Takikawa, Tokyo (JP)

(73) Assignee: RIVERFIELD INC., Tokyo (JP)

( * ) Notice: Subject to any disclaimer, the term of this patent is extended or adjusted under 35 U.S.C. 154(b) by 1102 days.

(21) Appl. No.: 17/434,950

(22) PCT Filed: Jan. 31, 2020

(86) PCT No.: PCT/JP2020/003778
§ 371 (c)(1),
(2) Date: Aug. 30, 2021

(87) PCT Pub. No.: WO2020/179311
PCT Pub. Date: Sep. 10, 2020

(65) Prior Publication Data
US 2022/0142700 A1    May 12, 2022

(30) Foreign Application Priority Data

Mar. 1, 2019 (JP) ................................. 2019-037652

(51) Int. Cl.
*A61B 18/14* (2006.01)
*A61B 17/00* (2006.01)
(Continued)

(52) U.S. Cl.
CPC .......... *A61B 18/1445* (2013.01); *A61B 34/30* (2016.02); *B25J 9/104* (2013.01);
(Continued)

(58) Field of Classification Search
CPC ................ A61B 18/1445; A61B 34/30; A61B 2018/00077; A61B 2018/00083; A61B 2018/00601
See application file for complete search history.

(56) References Cited

U.S. PATENT DOCUMENTS

| 4,512,343 A | 4/1985 | Falk et al. |
| 4,700,716 A * | 10/1987 | Kasevich .............. A61B 18/18 607/156 |

(Continued)

FOREIGN PATENT DOCUMENTS

| CN | 102258823 A | 11/2011 |
| CN | 103110456 A | 5/2013 |

(Continued)

OTHER PUBLICATIONS

International Search Report of PCT/JP2020/003778 dated Apr. 14, 2020 [PCT/ISA/210].

(Continued)

*Primary Examiner* — Joseph A Stoklosa
*Assistant Examiner* — Annie L Shoulders
(74) *Attorney, Agent, or Firm* — Sughrue Mion, PLLC (57) ABSTRACT

A surgical instrument of the present disclosure includes: a conductive cable member formed into a cable-like shape; a conductive outer shell covering a circumference of the cable member; first and second insulating portions made of materials having higher insulation properties than the cable member and the outer shell; a projecting portion projecting from a projecting insulating portion, which is one of the first and second insulating portions, toward a recessed insulating portion, which is the other, the cable member being inserted into the projecting portion; a conductive leading end portion separated from the recessed insulating portion and the outer shell, the leading end portion being bendable using tension of the cable member with an end portion connected thereto; and a power supply cable in a cable-like shape arranged inside the first and second insulating portions for supplying an electric power from outside to the leading end portion.

20 Claims, 10 Drawing Sheets

(51) Int. Cl.
  *A61B 34/30* (2016.01)
  *B25J 9/10* (2006.01)
  *B25J 17/02* (2006.01)
  *B25J 19/00* (2006.01)
  *H01B 9/00* (2006.01)
  *A61B 18/00* (2006.01)

(52) U.S. Cl.
  CPC ........... *B25J 17/02* (2013.01); *B25J 19/0029* (2013.01); *H01B 9/003* (2013.01); *A61B 2018/00077* (2013.01); *A61B 2018/00083* (2013.01); *A61B 2018/00601* (2013.01)

(56) References Cited

U.S. PATENT DOCUMENTS

| | | | |
|---|---|---|---|
| 5,976,130 A * | 11/1999 | McBrayer | A61B 18/1445 606/171 |
| 2005/0240147 A1 | 10/2005 | Makower et al. | |
| 2006/0079884 A1 * | 4/2006 | Manzo | A61B 34/37 606/41 |
| 2008/0114352 A1 * | 5/2008 | Long | A61B 18/148 606/49 |
| 2008/0275483 A1 | 11/2008 | Makower et al. | |
| 2009/0088775 A1 * | 4/2009 | Swarup | A61B 34/71 700/264 |
| 2009/0209955 A1 | 8/2009 | Forster et al. | |
| 2013/0123783 A1 | 5/2013 | Marczyk et al. | |
| 2014/0187893 A1 | 7/2014 | Clark et al. | |
| 2015/0157394 A1 | 6/2015 | Marczyk et al. | |
| 2015/0257666 A1 | 9/2015 | Clark et al. | |
| 2015/0342667 A1 | 12/2015 | Cornacchia | |
| 2016/0066982 A1 | 3/2016 | Marczyk et al. | |
| 2016/0192980 A1 | 7/2016 | Newton et al. | |
| 2017/0035502 A1 | 2/2017 | Clark et al. | |
| 2017/0164965 A1 | 6/2017 | Chang et al. | |
| 2018/0132740 A1 | 5/2018 | Clark et al. | |
| 2019/0380604 A1 | 12/2019 | Clark et al. | |
| 2021/0113260 A1 | 4/2021 | Tang et al. | |
| 2022/0096143 A1 * | 3/2022 | Godara | A61B 18/1482 |

FOREIGN PATENT DOCUMENTS

| | | |
|---|---|---|
| CN | 103908242 A | 7/2014 |
| CN | 105286989 A | 2/2016 |
| CN | 108272503 A | 7/2018 |
| DE | 32 17 105 A1 | 11/1983 |
| DE | 200 08 877 U1 | 8/2000 |
| JP | 11-332875 A | 12/1999 |
| JP | 2007-537784 A | 12/2007 |
| JP | 2009-540954 A | 11/2009 |
| JP | 2017-516628 A | 6/2017 |

OTHER PUBLICATIONS

International Preliminary Report on Patentability with the translation of Written Opinion dated Sep. 16, 2021 from the International Bureau in International Application No. PCT/JP2020/003778.

Extended European Search Report dated May 23, 2022, issued in European Application No. 20765956.6.

Office Action issued Jan. 29, 2022 in Chinese Application No. 202080017809.9.

* cited by examiner

SURGICAL INSTRUMENT FOR SURGICAL ASSIST ROBOT

CROSS-REFERENCE TO RELATED APPLICATION

This application is a National Stage of International Application No. PCT/JP2020/003778, filed Jan. 31, 2020, claiming the benefit of Japanese Patent Application No. 2019-037652 filed on Mar. 1, 2019 with the Japan Patent Office, and the entire contents of each of which are herein incorporated by reference in their entireties.

TECHNICAL FIELD

The present disclosure relates to a surgical instrument for a surgical assist robot.

BACKGROUND ART

In surgical operations and the like, a technique has been suggested in which an electric magnet is used to open and close a surgical instrument to modify or destroy a diseased portion (see, for example, Patent Document 1). In addition, various types of instruments to perform incision and hemostasis using a high frequency current have been proposed (see, for example, Patent Documents 2 and 3). As an instrument to perform incision and hemostasis, for example, electric scalpels are known.

PRIOR ART DOCUMENTS

Patent Documents

Patent Document 1: JP 2009-540954A
Patent Document 2: JP 2017-516628A
Patent Document 3: JP 2007-537784A

SUMMARY OF THE INVENTION

Problems to be Solved by the Invention

In Patent Document 1, a surgical instrument includes a lead conducting an electric current, and the surgical instrument is opened and closed by the electric current supplied via the lead. In Patent Documents 2 and 3, a supplied high frequency current flows through an incision site, and cells of the incision site are heated, whereby incision is made. In addition, the hemostasis of a site adjacent to the incision site is made by the heat.

However, as a result of detailed review by the inventor, it was found that the techniques described in the aforementioned Patent Documents 1 to 3 were difficult to be applied to a surgical instrument used for a surgical assist robot. Specifically, it was found that, if the high frequency current or the like supplied to the surgical instrument flows from the surgical instrument into the surgical assist robot, the flow may cause failures and/or malfunctions of a sensor equipment and a control equipment installed in the surgical assist robot.

In one aspect of the present disclosure, it is preferable to provide a surgical instrument for a surgical assist robot, the surgical instrument capable of reducing a risk of failures and malfunctions.

Means for Solving the Problems

A surgical instrument for a surgical assist robot as one mode of the present disclosure comprises: a cable member having conductivity and formed into a cable-like shape; an outer shell having a shape covering a circumference of the cable member and having conductivity; a first insulating portion arranged in a part of a space between the cable member and the outer shell, wherein the first insulating portion is made of a material having a higher insulation property than the cable member and the outer shell; a second insulating portion arranged at a position, which exists between the cable member and the outer shell and which is adjacent to the first insulating portion, wherein the second insulating portion is made of a material having a higher insulation property than the cable member and the outer shell; a projecting portion projecting from a projecting insulating portion, which is one of the first insulating portion and the second insulating portion, toward a recessed insulating portion, which is the other, wherein the cable member is inserted into the projecting portion; a recessed portion formed in the recessed insulating portion, wherein the projecting portion is inserted into the recessed portion; a leading end portion arranged to be separated from the recessed insulating portion and the outer shell, wherein the leading end portion has conductivity and is bendable using tension of the cable member, whose end portion is connected to the leading end portion; and a power supply cable, which is a member having a cable-like shape and arranged inside the first insulating portion and the second insulating portion, for supplying an electric power from an outside to the leading end portion.

In this configuration, the projecting portion projects from the projecting insulating portion, which is one of the first insulating portion and the second insulating portion, toward the recessed insulating portion, which is the other. The cable member is inserted into the projecting portion. The projecting portion is inserted into the recessed portion formed in the other. Thus, a creeping distance necessary for insulation is provided. Thus, it is possible to inhibit the electric power supplied to the leading end portion from flowing into the outer shell via the cable member. The creeping distance from the cable member to the outer shell can be lengthened as compared with a case where contact surfaces between the first insulating portion and the second insulating portion are planner, for example. With the creeping distance longer than a creeping distance determined based on the voltage of the high frequency current supplied to the leading end portion, it is possible to inhibit the electric power from flowing from the cable member to the outer shell through a path between the recessed insulating portion and the projecting portion.

As a result, it is possible to inhibit the electric current from flowing from the outer shell to the surgical assist robot, thereby reducing a risk of failures and malfunctions. Here, the creeping distance is a length of a path along a surface of an insulating portion having a higher insulation property than an air. In other words, the creeping distance is a length of a path, through which the electric power is more likely to flow than the insulating portion.

In another mode of the present disclosure, it is preferable that the projecting insulating portion includes a recessed insertion portion, into which the projecting portion is inserted.

In this way, by forming the insertion portion, into which the projecting portion is inserted, in the projecting insulating portion, the projecting insulating portion and the projecting portion can be formed separately. For example, as compared with a case where the projecting insulating portion and the projecting portion are formed integrally, it is easy to produce the projecting insulating portion and the projecting portion and also it is easy to reduce the sizes and diameters.

In addition, by inserting the projecting portion into the insertion portion formed in the projecting insulating portion, the creeping distance can be easily lengthened compared to a case where the projecting portion is not inserted into the projecting insulating portion. Thus, the electric current is less likely to flow from the cable member to the outer shell through a path between the projecting insulating portion and the projecting portion.

In another mode of the present disclosure, it is preferable that the projecting portion is formed integrally with the projecting insulating portion.

In this way, by forming the projecting portion and the projecting insulating portion integrally, the number of parts can be reduced compared to a case where the projecting portion and the projecting insulating portion are formed separately.

In another mode of the present disclosure, it is preferable that the recessed portion is a through hole that is provided in the recessed insulating portion and the cable member is arranged inside the through hole.

In this way, the through hole provided in the recessed insulating portion such that the cable member is arranged in the through hole is used as the recessed portion; thus, it is not necessary to form the through hole and the recessed portion separately. Also, it is easier to reduce the size and diameter.

Effects of the Invention

In the surgical instrument for the surgical assist robot of the present disclosure, the projecting portion projects from the projecting insulating portion, which is one of the first insulating portion and the second insulating portion, toward the recessed insulating portion, which is the other. The cable member is inserted in the projecting portion. The projecting portion is inserted into the recessed portion formed in the recessed insulating portion. Thus, there are effects of inhibiting the electric current from flowing from the outer shell to the surgical assist robot and of reducing a risk of failures and malfunctions.

EXPLANATION OF REFERENCE NUMERALS 1, 101 . . . surgical instrument (surgical instrument for a surgical assist robot); 10 . . . shaft (outer shell); 20 . . . surgical instrument body (leading end portion); 30, 130 . . . first insulating portion; 33 . . . insertion portion; 40 . . . second insulating portion; 42 . . . second wire through hole (recessed portion); 50 . . . insulating pipe (projecting portion); 60 . . . power supply cable; 70 . . . driving wire (cable member); 133 . . . projecting portion

MODE FOR CARRYING OUT THE INVENTION

A surgical instrument for a surgical assist robot according to one embodiment of the invention will be described with reference to FIG. 1 to FIG. 9. Hereinafter, the surgical instrument for the surgical assist robot is also referred to as a surgical instrument 1.

The surgical instrument 1 of the present embodiment is applied to a surgical assist robot used for operations such as endoscope operations.

Figure 1:
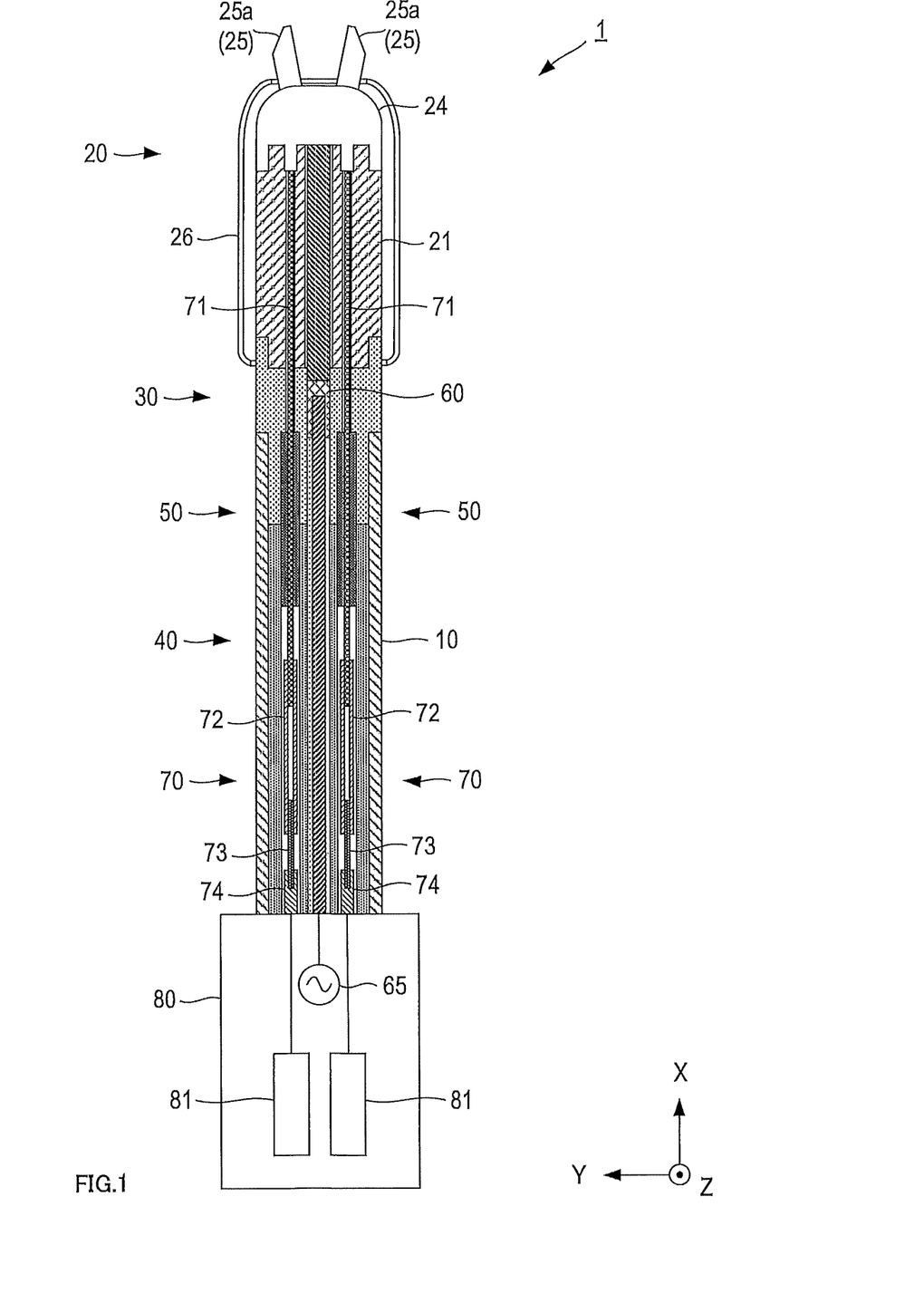
FIG. 1 is a schematic sectional view illustrating a configuration of a surgical instrument according to one embodiment of the present disclosure.

The surgical instrument 1 includes, as shown in FIG. 1, a shaft 10 forming an outer shape of the surgical instrument 1, a surgical instrument body 20, a first insulating portion 30, a second insulating portion 40, two insulating pipes 50, a power supply cable 60 supplying a high frequency current to the surgical instrument body 20, and two driving wires 70 transmitting a driving force to operate the surgical instrument body 20.

Note that the shaft 10, the surgical instrument body 20, the insulating pipe 50 and the driving wire 70 used herein respectively correspond to examples of an outer shell, a leading end portion, a projecting portion and a cable member.

Note that in FIG. 1, to help understanding, a ratio of lengths in the surgical instrument 1 is suitably changed and illustrated. Specifically, a length in an X-axis direction is illustrated shorter than an actual length, and lengths in a Y-axis direction and a Z-axis direction are illustrated longer than actual lengths.

The shaft 10 forms the outer shape of the surgical instrument 1 together with the surgical instrument body 20 and the first insulating portion 30. The shaft 10 is arranged between a cartridge 80, which is a base of the surgical instrument 1, and the first insulating portion 30. The shaft 10 is formed into a tubular shape, more specifically a cylindrical shape, covering circumferences of the driving wires 70. In the present embodiment, the shaft 10 is arranged to extend in the X-axis direction.

The shaft 10 is made of a material having conductivity. Examples of the material having conductivity to form the shaft 10 may include a metallic material, such as stainless steel that is steel containing chromium or steel containing chromium and nickel, aluminum, or an alloy containing aluminum. Note that, as the stainless steel, for example, stainless steel referred to as SUS304 in a code of Japanese Industrial Standards (JIS) may be used.

The surgical instrument body 20 is arranged in a leading end of the surgical instrument 1, and used for operations such as endoscope operations. Note that the leading end of the surgical instrument 1 means an end portion on a positive side in the X-axis direction. In the present embodiment, the surgical instrument body 20 is a pair of forceps that can be supplied with a high frequency current.

The surgical instrument body 20 is arranged at a position adjacent to the first insulating portion 30. In other words, the first insulating portion 30 is arranged between the surgical instrument body 20 and the shaft 10. The surgical instrument body 20 is arranged to be separated from the shaft 10 by the first insulating portion 30.

Figure 2:
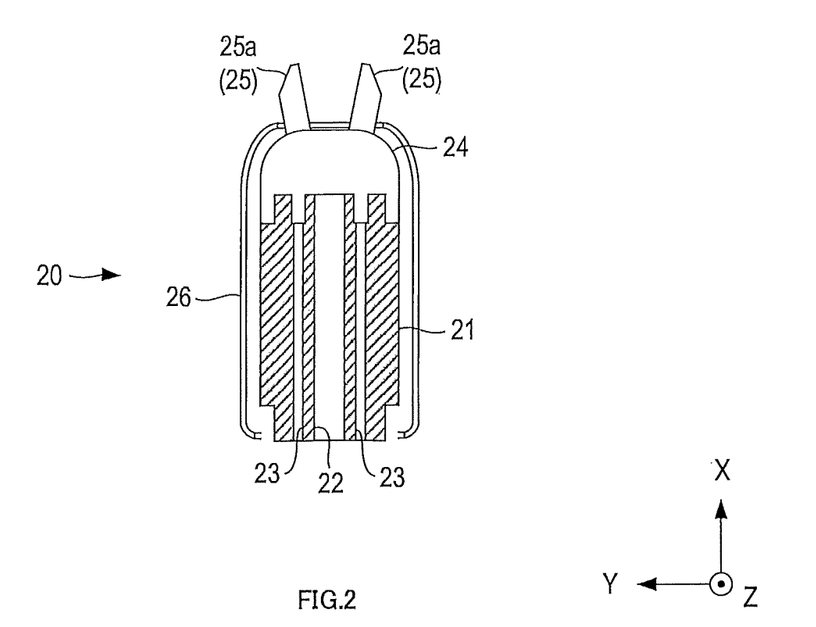
FIG. 2 is a schematic sectional view illustrating a configuration of a surgical instrument body of FIG. 1.

As shown FIG. 1 and FIG. 2, the surgical instrument body 20 includes a joint 21, a forceps portion 24, and a cover 26. The joint 21 and the forceps portion 24 are made of a material or materials having conductivity. Examples of the material or materials having conductivity to form the surgical instrument body 20 may include a metallic material, such as stainless steel that is steel containing chromium or steel containing chromium and nickel, aluminum, or an alloy containing aluminum. Note that, as the stainless steel, for example, the stainless steel referred to as SUS304 in the code of Japanese Industrial Standards (JIS) may be used.

The joint 21 is a member having a pillar-like external shape, more specifically a columnar external shape and arranged to be adjacent to the first insulating portion 30 to support the forceps portion 24. The joint 21 has a configuration bendable using tension of the driving wires. In the present embodiment, the joint 21 can bend around a rotational axis extending in the Y-axis direction, and bend around a rotational axis extending in the Z-axis direction.

As shown in FIG. 2, the joint 21 includes at least a joint cable hole 22 and two joint wire arrangement holes 23. The joint cable hole 22 is a through hole formed to extend in the X-axis direction in the center of the joint 21, which extends in the pillar-like shape. The power supply cable 60 is inserted through the joint cable hole 22. The joint cable hole 22 is formed to have a diameter larger than the diameter of the power supply cable 60 to be inserted.

The two joint wire arrangement holes 23 are two through holes provided at an interval on a virtual circle centering the joint cable hole 22. The driving wires 70 are arranged in the joint wire arrangement holes 23. The driving wires 70 used for opening and closing a below-described holding portion 25 and the driving wires used for bending the joint 21 are inserted in the joint wire arrangement holes 23. When both types of wires are collectively referred to, they will be described as "driving wires 70 and the like".

In the joint wire arrangement holes 23, the hole for inserting the driving wire used for bending the joint 21 has a configuration enabling transmission of the tension of the driving wire to the joint 21.

The forceps portion 24 is supported by the joint 21 and used for operations, such as endoscope operations. The forceps portion 24 is conductively coupled to the power supply cable 60, and is supplied with the high frequency current via the power supply cable 60. In the present embodiment, the forceps portion 24 is a monopolar type. The monopolar type is also referred to as a unipolar type.

The forceps portion 24 includes the holding portion 25 that is opened and closed. The holding portion 25 is opened and closed by the driving wires 70. As a mechanism to open and close the holding portion 25, a mechanism may be adopted in which the driving wire 70 is wound around a first holding body 25a of two holding bodies 25a constituting the holding portion 25, whereby the first holding body 25a can be driven to open and close while a second holding body 25a is fixed. Alternatively, a mechanism may also be adopted in which the driving wires 70 are wound around the two holding bodies 25a respectively, whereby both of the two holding bodies 25a are driven to open and close.

The cover 26 is a member formed into a cylindrical shape to cover circumferences of the joint 21 and the forceps portion 24. The cover 26 includes an opening on a leading end side such that the holding portion 25 can project through the opening. Note that the leading end side of the cover 26 means the positive side in the X-axis direction. The cover 26 is made of a material having a higher insulation property than the shaft 10, the power supply cable 60, the driving wires 70 and the like, such as a material having flexibility including rubber that can be used in endoscopic surgeries and the like.

Figure 3:
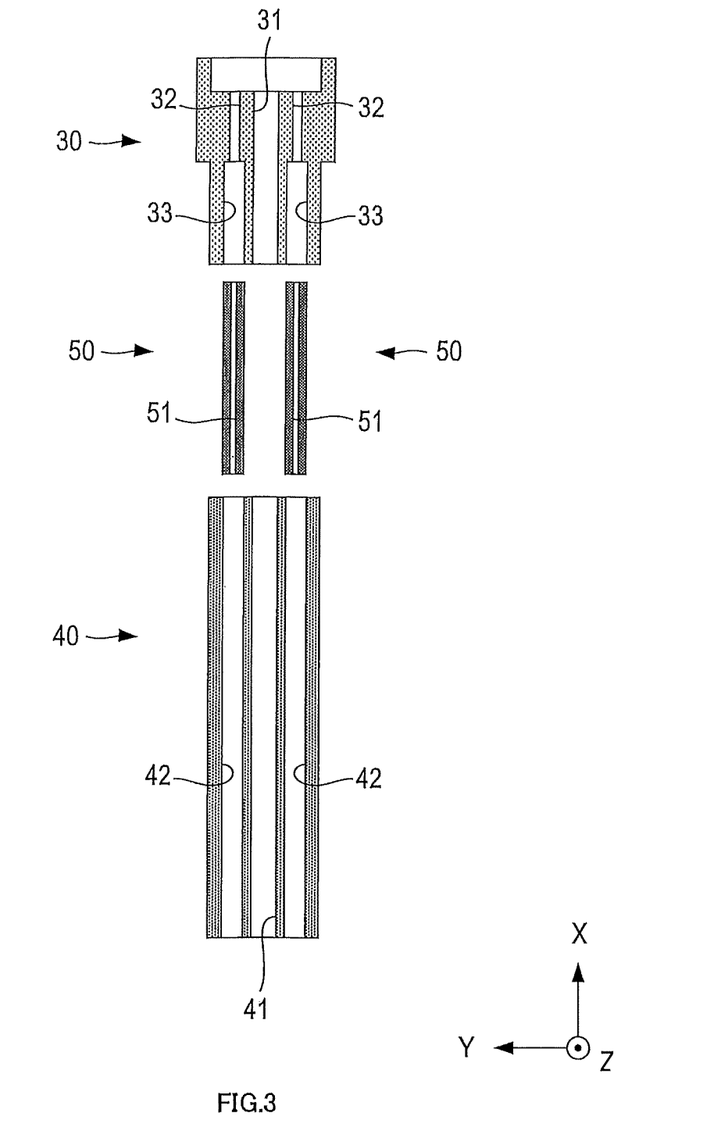
FIG. 3 is a schematic sectional view illustrating a configuration of a first insulating portion, a second insulating portion and an insulating pipe of FIG. 1.

In the first insulating portion 30, as shown in FIG. 1 and FIG. 3, a portion on a surgical instrument body 20 side forms the outer shape of the surgical instrument 1, and a portion on a cartridge 80 side is arranged inside the shaft 10. The surgical instrument body 20 and the shaft 10 are arranged to be separated in the X-axis direction. The first insulating portion 30 is a member made of a material having a higher insulation property than the shaft 10, the power supply cable 60, the driving wires 70 and the like and having a pillar-like external shape, or more specifically a columnar external shape. Examples of the material having the insulation property may include resin materials, such as PEEK. Note that PEEK is abbreviation for polyether ether ketone.

The first insulating portion 30 includes at least a first cable hole 31, through which the power supply cable 60 is inserted, two first wire arrangement holes 32, in which the driving wires 70 and the like are arranged, and two insertion portions 33, in which below-described insulating pipes 50 are arranged.

The first cable hole 31 is a through hole that is formed to extend in the X-axis direction in the center of the first insulating portion 30 extending in the pillar-like shape and that communicates with the joint cable hole 22. The first cable hole 31 is formed to have a diameter equal to or larger than the diameter of the power supply cable 60 to be inserted.

The two first wire arrangement holes 32 are two through holes provided in the first insulating portion 30 on the surgical instrument body 20 side at an interval on a virtual circle centering the first cable hole 31. The two first wire arrangement holes 32 are through holes communicating with the joint wire arrangement holes 23 respectively.

The two insertion portions 33 are recesses or holes having bottom surfaces, and a part of the insulating pipe 50 is inserted into each of the two insertion portions 33. The two insertion portions 33 are provided in the first insulating portion 30 on a second insulating portion 40 side at an interval on a virtual circle centering the first cable hole 31. The two insertion portions 33 communicate with the first wire arrangement holes 32 respectively.

As shown in FIG. 1 and FIG. 3, the second insulating portion 40 has a pillar-like external shape, more specifically a columnar external shape to be arranged inside the shaft 10. An end portion of the second insulating portion 40 on the surgical instrument body 20 side is arranged to abut the first insulating portion 30. The second insulating portion 40 is a member that is made of a material having a higher insulation property than the shaft 10, the power supply cable 60, the driving wires 70 and the like and that is formed into a pillar-like shape. Examples of the material having the insulation property may include resin materials, such as PTFE and PFA. Note that PTFE is abbreviation for polytetrafluoroethylene and PFA is abbreviation for perfluoroalkoxy alkane.

The second insulating portion 40 includes at least a second cable hole 41, through which the power supply cable 60 is inserted, and two second wire through holes 42, in which the driving wires 70 and the like are arranged. In other words, the second insulating portion 40 is a multi-holed tube, such as a lumen tube, in which multiple through holes, such as the second cable hole 41 and the second wire through holes 42, are formed. Note that the second wire through hole 42 is a configuration corresponding to one example of a recessed portion. Also note that the second insulating portion 40 provided with the recessed portion corresponds to one example of a recessed insulating portion.

The second cable hole 41 is a through hole that is formed to extend in the X-axis direction in the center of the second insulating portion 40 extending in a pillar-like shape and that communicates with the first cable hole 31. The second cable hole 41 has a diameter equal to or larger than the diameter of the power supply cable 60 to be inserted.

The two second wire through holes 42 are through holes provided at an interval on a virtual circle centering the second cable hole 41. The two second wire through holes 42 are through holes communicating with the insertion portions 33 respectively. The driving wires 70 and the like are arranged in the two second wire through holes 42 respectively. Also, the second wire through holes 42 are holes, into which the other part of the insulating pipes 50 are inserted.

As shown in FIG. 1 and FIG. 3, the two insulating pipes 50 are formed into pillar-like shapes respectively. Each of the two insulating pipes 50 has a through hole 51, into which the driving wire 70 is inserted. Also, a first insulating portion 30 side of the insulating pipe 50 is inserted into the insertion portion 33, and a second insulating portion 40 side of the insulating pipe 50 is inserted into the second wire through hole 42.

As shown in FIG. 1, the power supply cable 60 supplies the high frequency current from a power source 65 to the surgical instrument body 20. The power supply cable 60 is formed into a cable-like shape, and arranged to extend along the X-axis direction while passing through the insides of the joint cable hole 22, the first cable hole 31, and the second cable hole 41. Any cable that can supply the high frequency current may be used for the power supply cable 60, and the structure and the material thereof are not specifically limited.

An end portion of the power supply cable 60 on the leading end side is connected to the forceps portion 24 of the surgical instrument body 20 so that the high frequency current can be conducted. An end portion of the power supply cable 60 on a rear end side is connected to the power source 65 that supplies the high frequency current. Note that the leading end side and the rear end side of the power supply cable 60 respectively mean the positive side and the negative side in the X-axis direction.

In the present embodiment, the power source 65 is arranged in the cartridge 80, to which the surgical instrument 1 is attached. However, the location of the power source 65 is not limited to the cartridge 80, and the power source 65 may be arranged elsewhere than the cartridge 80. Also, any power source that can supply the high frequency current may be used for the power source 65, and the form and the configuration thereof are not limited.

As shown in FIG. 1, the two driving wires 70 transmit the driving force to open and close the holding portion 25 of the surgical instrument body 20. Each of the two driving wires 70 is formed into a cable-like shape and arranged to extend along the X-axis direction while passing through insides of the joint wire arrangement hole 23, the first wire arrangement hole 32, the through hole 51, and the second wire through hole 42.

Figure 4:
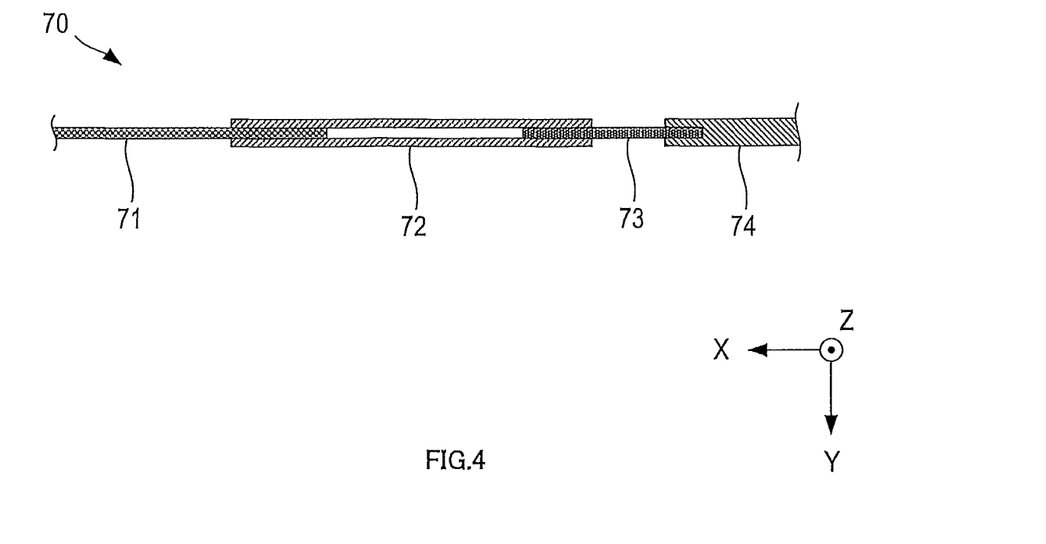
FIG. 4 is a schematic sectional view illustrating a configuration of a driving wire of FIG. 1.

As shown in FIG. 4, each of the two driving wires 70 includes at least a stranded wire 71, a first transmission rod 72, a linear insulation body 73, and a second transmission rod 74. The stranded wire 71 is formed by twisting two or more fine wires made of a material having conductivity, such as a metallic material. The stranded wire 71 is arranged between the first transmission rod 72 and the surgical instrument body 20 to transmit the transmitted driving force to the holding portion 25.

Specifically, an end portion of the stranded wire 71 is fixed to the first transmission rod 72 arranged in the second wire through hole 42. The stranded wire 71 is arranged to extend toward the surgical instrument body 20 though an inside of the second wire through hole 42. Furthermore, the stranded wire 71 is arranged to extend through insides of the through hole 51, the first wire arrangement hole 32, and the joint wire arrangement hole 23 such that the stranded wire 71 can move along the X-axis direction.

The first transmission rod 72 is a member formed into a cylindrical shape from a material having conductivity, such as a metallic material. The first transmission rod 72 is a member arranged inside the second wire through hole 42 and between the stranded wire 71 and the linear insulation body 73. The first transmission rod 72 is arranged to be movable inside the second wire through hole 42 along the X-axis direction. An end portion of the stranded wire 71 is fixed to an end portion of the first transmission rod 72 on the surgical instrument body 20 side. An end portion of the linear insulation body 73 is fixed to an end portion of the first transmission rod 72 on the cartridge 80 side.

The linear insulation body 73 is formed into a cable-like shape from a material having an insulation property. In other words, the linear insulation body 73 is formed by twisting synthetic fibers. The linear insulation body 73 prevents or inhibits the high frequency current from flowing into the cartridge 80 via the driving wire 70. Examples of the material having the insulation property may include polyarylate.

The second transmission rod 74 is a member formed into a cylindrical shape from a material having conductivity, such as a metallic material. The second transmission rod 74 is a member arranged inside the second wire through hole 42 and between the linear insulation body 73 and a pneumatic actuator 81. The second transmission rod 74 is arranged to be movable inside the second wire through hole 42 along the X-axis direction. An end portion of the linear insulation body 73 is fixed to an end portion of the second transmission rod 74 on the surgical instrument body 20 side. An end portion of the second transmission rod 74 on the cartridge 80 side is connected to the pneumatic actuator 81 to enable transmission of a force.

Figure 5:
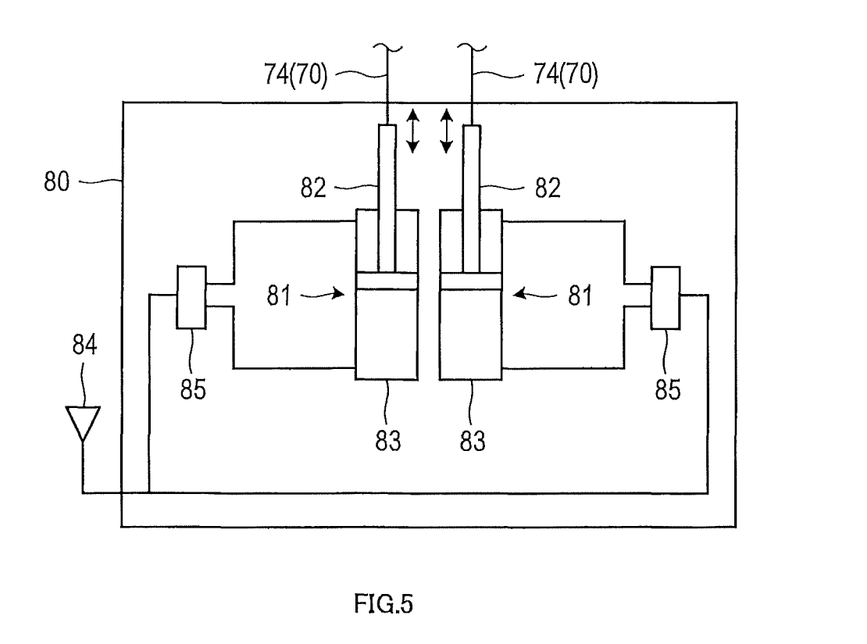
FIG. 5 is a schematic sectional view illustrating a configuration of a pneumatic actuator of FIG. 1.

As shown in FIG. 1 and FIG. 5, an end portion of the driving wire 70 on a rear end side, in other words, an end portion of the second transmission rod 74 is connected to the pneumatic actuator 81 to generate a driving force. Note that the rear end side of the driving wire 70 is the negative side in the X-axis direction. In FIG. 1, two pneumatic actuators 81 are illustrated. However, the number of the pneumatic actuator 81 is not limited to two. For example, two pneumatic actuators 81 may be arranged to drive each of the two holding portions 25a constituting the holding portion 25; thus, a total of four pneumatic actuators 81 may be arranged. Furthermore, a pneumatic actuator to bend the joint 21 may be additionally arranged.

The pneumatic actuator 81 generates a driving force to open and close the holding portion 25 of the surgical instrument body 20. The pneumatic actuator 81 includes a piston 82 and a cylinder 83.

The piston 82 is arranged to be linearly movable relative to the cylinder 83. An end of the second transmission rod 74 is arranged in a portion of the piston 82 protruding from the cylinder 83.

The cylinder 83 is a member formed into a cylindrical shape with both ends closed. The internal space of the cylinder 83 is divided into two sections by the piston 82. The cylinder 83 includes a piping to feed a pressurized air, which is supplied from an air supplier 84, to the two sections.

A valve 85 controlling a supply destination of the pressurized air is provided between the cylinder 83 and the air supplier 84. The valve 85 controls the supply destination of the pressurized air from the air supplier 84. Specifically, the valve 85 is for selecting whether to feed the pressurized air to a first section or to feed the pressurized air to a second section between the two sections of the cylinder 83.

The pneumatic actuator 81, the valve 85, the piping for air supply and the like are arranged inside the cartridge 80. Note that the pneumatic actuator 81, the valve 85, the piping for air supply and the like may be arranged elsewhere than the cartridge 80.

Next, an operation in the surgical instrument 1 having the above-described configuration will be described. First, an opening-closing operation of the holding portion 25 in the surgical instrument body 20 will be described with reference to FIG. 1 and FIG. 5.

When opening and closing the holding portion 25 of the surgical instrument body 20, as shown in FIG. 1, one of the driving wires 70 is pulled in the negative X-axis direction while the other is sent out in the positive X-axis direction.

As shown in FIG. 5, the driving wire 70 is pulled and sent out by the driving force generated in the pneumatic actuator 81. Specifically, the pressurized air supplied from the air supplier 84 is fed to the pneumatic actuator 81, whereby the driving force is generated.

The internal space of the cylinder 83 is divided into two sections by the piston 82. Whether the driving force is generated in a pulling direction or in a sending-out direction is controlled by selecting the section to be supplied with the pressurized air. The valve 85 selects the section to be supplied with the pressurized air.

Next, a method of supplying an electric power to the holding portion 25 of the surgical instrument body 20 will be described with reference to FIG. 1. When supplying the electric power to the holding portion 25, a high frequency current is supplied from the power source 65 to the surgical instrument body 20. The high frequency current is applied to the forceps portion 24 of the surgical instrument body 20 via the power supply cable 60. The high frequency current is applied from the forceps portion 24 to the holding portion 25.

Figure 6:
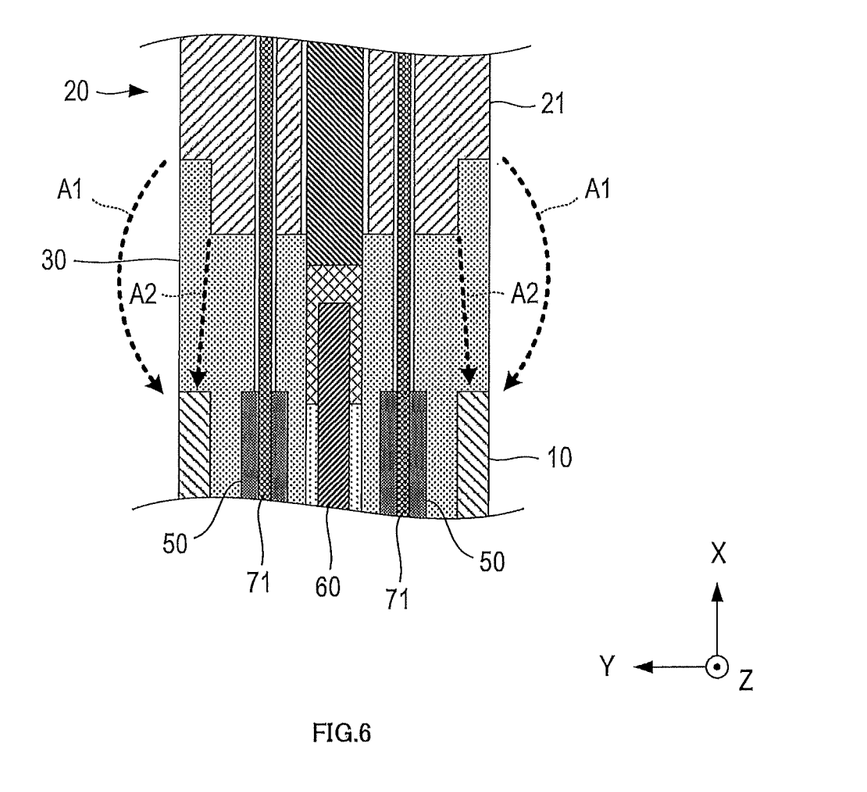
FIG. 6 is a schematic sectional view illustrating insulation between the surgical instrument body and a shaft.
Figure 7:
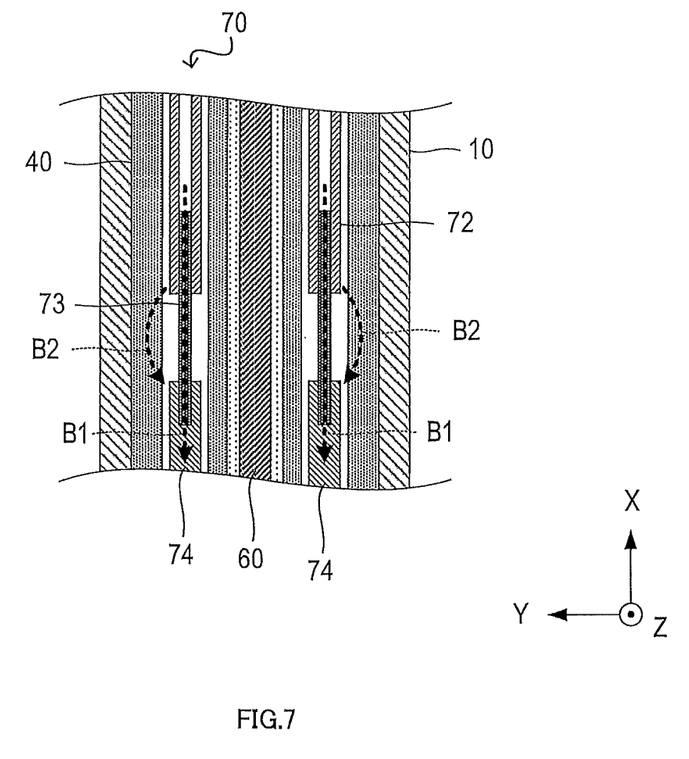
FIG. 7 is a schematic sectional view illustrating insulation in the driving wire.
Figure 8:
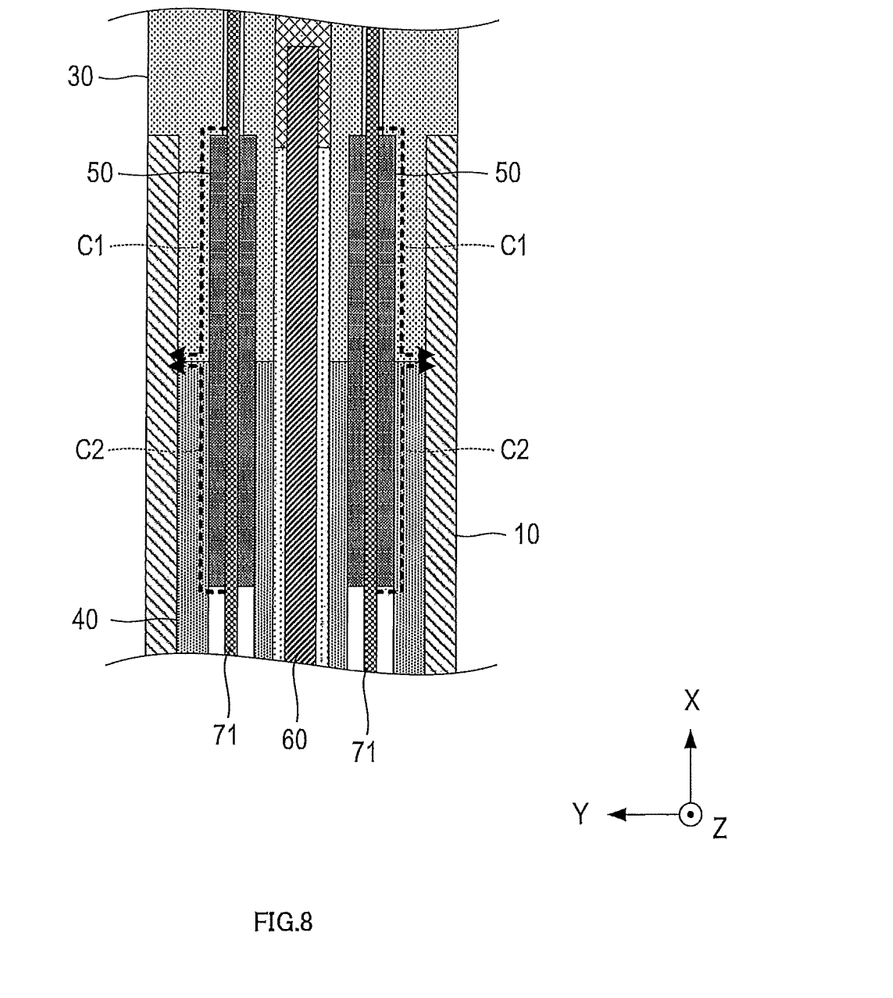
FIG. 8 is a schematic sectional view illustrating insulation between the driving wire and the shaft.

Next, insulation in the surgical instrument 1 will be described with reference to FIG. 6 to FIG. 8. First, with reference to FIG. 6, the insulation between the shaft 10 and the surgical instrument body 20 will be described. The first insulating portion 30 is arranged between the shaft 10 and the joint 21 of the surgical instrument body 20. Thus, a path A1 along the outer surface of the first insulating portion 30 and a path A2 inside the first insulating portion 30 may be considered as paths, through which the high frequency current supplied to the surgical instrument body 20 flows into the shaft 10.

In the path A1, a distance between the shaft 10 and the joint 21 is designed to have a length necessary for insulation; thus, the high frequency current is less likely to flow. In the path A2, the first insulating portion 30 is made of the material having a high insulation property; thus, the high frequency current is less likely to flow. In other words, the insulation is designed for both of the path A1 and the path A2.

Next, insulation in the driving wire 70 will be described with reference to FIG. 7. Specifically, the insulation between the first transmission rod 72 and the second transmission rod 74 will be described. The linear insulation body 73 is arranged between the first transmission rod 72 and the second transmission rod 74. The surgical instrument body 20, the stranded wire 71 and the first transmission rod 72 are connected to be electrically conductive.

Thus, a path B1 along the linear insulation body 73 and a path B2 through a space between the first transmission rod 72 and the second transmission rod 74 may be considered as paths, through which the high frequency current supplied to the surgical instrument body 20 flows into the second transmission rod 74 via the stranded wire 71 and the first transmission rod 72.

In the path B1, the linear insulation body 73 is made of the material having a high insulation property; thus, the high frequency current is less likely to flow. In the path B2, a distance between the first transmission rod 72 and the second transmission rod 74 is designed to have a length necessary for insulation; thus, the high frequency current is less likely to flow. In other words, the insulation is designed for both of the path B1 and the path B2.

Next, insulation between the shaft 10 and the driving wire 70 will be described with reference to FIG. 8. Specifically the insulation between the shaft 10 and the stranded wire 71 of the driving wire 70 will be described.

A path C1 along a boundary between the first insulating portion 30 and the insulating pipe 50 and a boundary between the first insulating portion 30 and the second insulating portion 40 and a path C2 along a boundary between the second insulating portion 40 and the insulating pipe 50 and a boundary between the first insulating portion 30 and the second insulating portion 40 may be considered as paths, through which the high frequency current supplied to the surgical instrument body 20 flows into the shaft 10 via the stranded wire 71.

Figure 9:
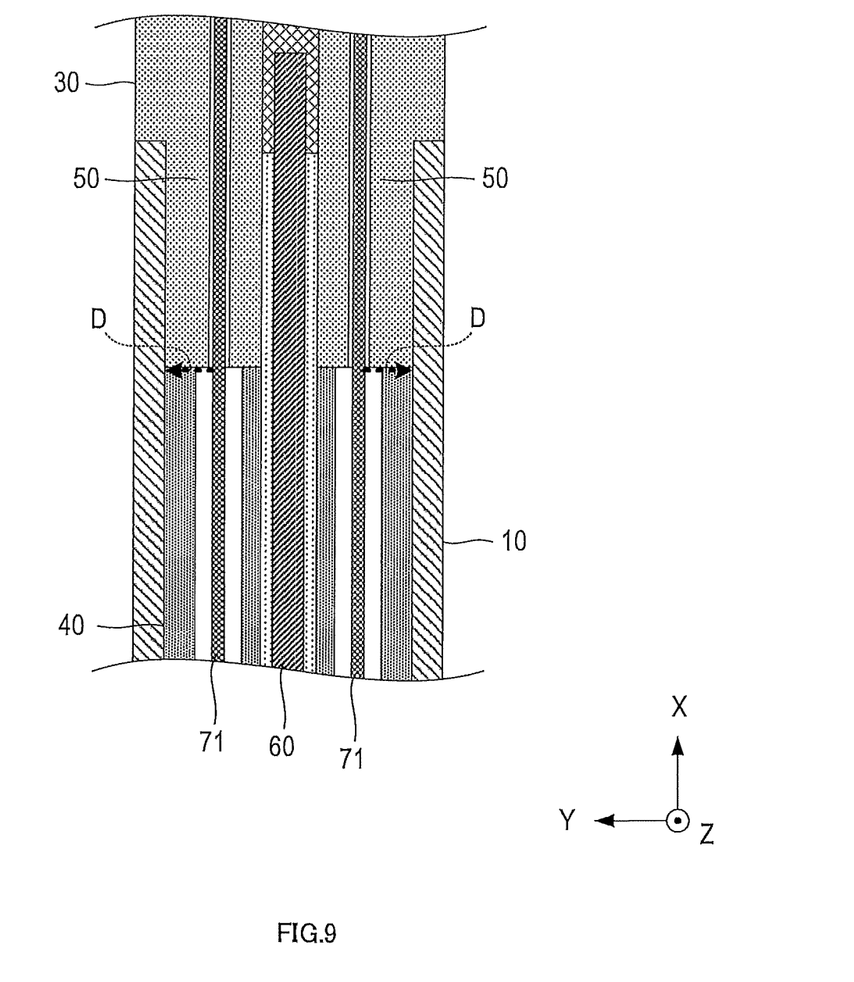
FIG. 9 is a schematic sectional view illustrating conventional insulation between a driving wire and a shaft.

A creeping distance is longer than a creeping distance of a path D, through which the high frequency current flows between the stranded wire 71 and the shaft 10 in a case where the insulating pipe 50 is not provided as shown in FIG. 9, for example. Note that the creeping distance is a length of each of the path C1 and the path C2, and a length along a surface of the insulative member having a higher insulation property than an air. In other words, the creeping distance is a length of a path, through which the electric power is more likely to flow than the insulative member.

The creeping distances of the path C1 and the path C2 can be lengthened by extending the insulating pipe 50. In other words, it is possible to lengthen the creeping distances of the path C1 and the path C2 without increasing the diameter of the shaft 10.

In this way, the path C1 and the path C2 are designed such that their creeping distances are the lengths necessary for the insulation; thus, the high frequency current is less likely to flow. In other words, the insulation is designed for both of the path C1 and the path C2. Note that the length necessary for the insulation is a distance determined based on a voltage of the high frequency current supplied to the surgical instrument body 20.

With the surgical instrument 1 having the above-described configuration, by inserting the insulating pipe 50 into the insertion portion 33 of the first insulating portion 30 and the second wire through hole 42 of the second insulating portion 40, the creeping distances necessary for the insulation can be provided in the path C1 and the path C2. Thus, it is possible to inhibit the electric power supplied to the surgical instrument body 20 from flowing into the shaft 10 via the driving wire 70.

For example, as compared with a case where contact surfaces of the first insulating portion 30 and the second insulating portion 40 are planner as shown in FIG. 9, the creeping distance from the driving wire 70 to the shaft 10 can be lengthened. As a result, it is possible to inhibit the electric current from flowing from the shaft 10 to the surgical assist robot via the cartridge 80, thereby reducing a risk of failures and malfunctions of a sensor equipment and a control equipment installed in the surgical assist robot.

The first insulating portion 30, the second insulating portion 40, and the insulating pipe 50 are formed separately and are configured such that the insulating pipe 50 is inserted into the insertion portion 33 of the first insulating portion 30 and the second wire through hole 42 of the second insulating portion 40. This makes it easy to produce the first insulating portion 30, the second insulating portion 40, and the insulating pipe 50 compared to a configuration, in which a projecting insulating portion that is either one of the first insulating portion 30 and the second insulating portion 40 and the insulating pipe 50 are integrally formed. Also, this makes it easier to reduce the sizes and diameters of the first insulating portion 30, the second insulating portion 40, and the insulating pipe 50. As a result, it is also easier to reduce the size and the diameter of the surgical instrument 1.

The insulating pipe 50 is inserted into the second wire through hole 42 formed in the second insulating portion 40, in which the driving wire 70 is arranged. Thus, it is not necessary to separately produce a through hole for arranging the driving wire 70 and a recessed portion for inserting the insulating pipe 50. Also, this makes it easier to reduce the size and the diameter of the second insulating portion 40.

Figure 10:
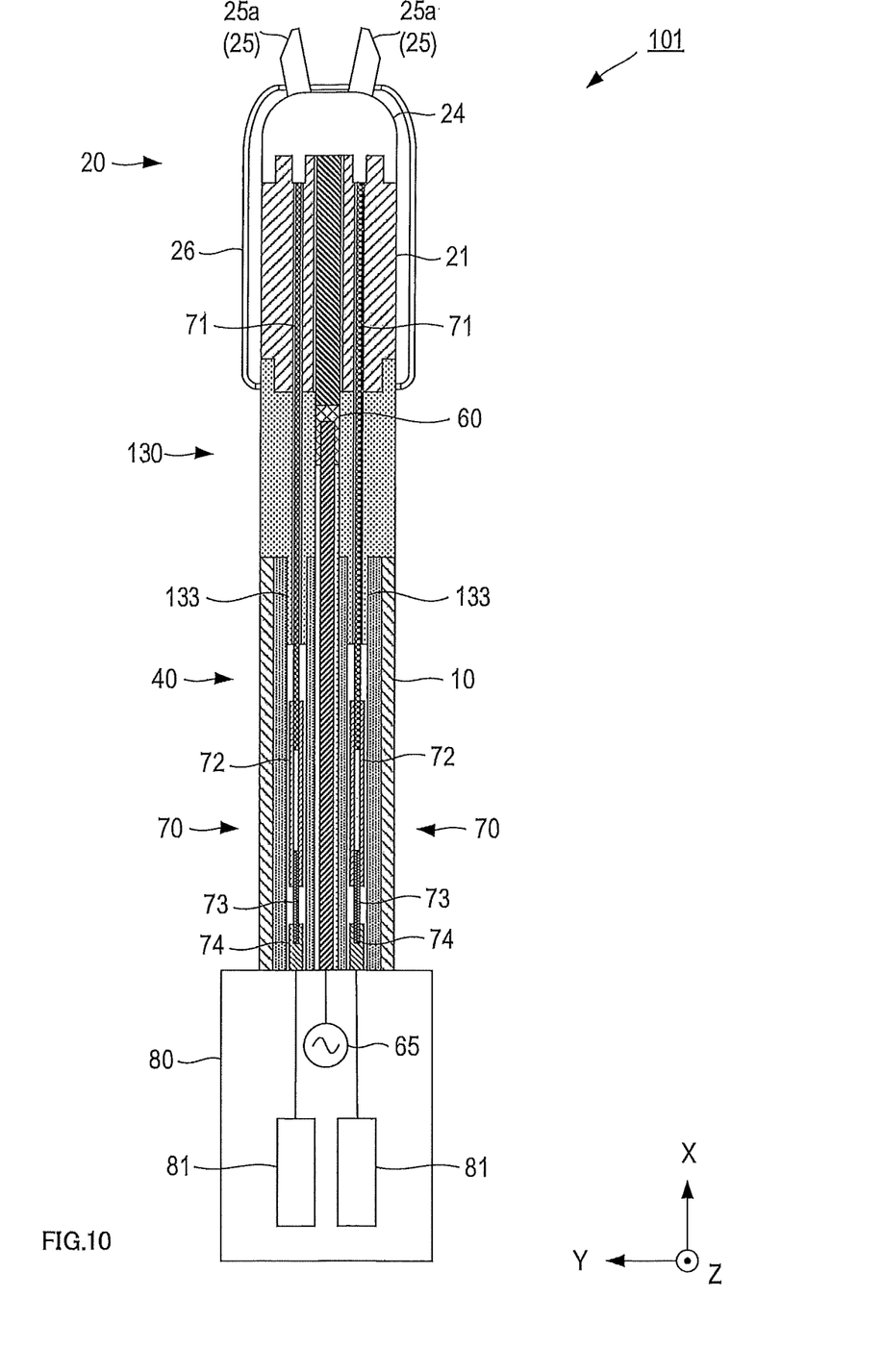
FIG. 10 is a schematic sectional view illustrating a configuration of a surgical instrument according to another embodiment of the present disclosure.
Figure 11:
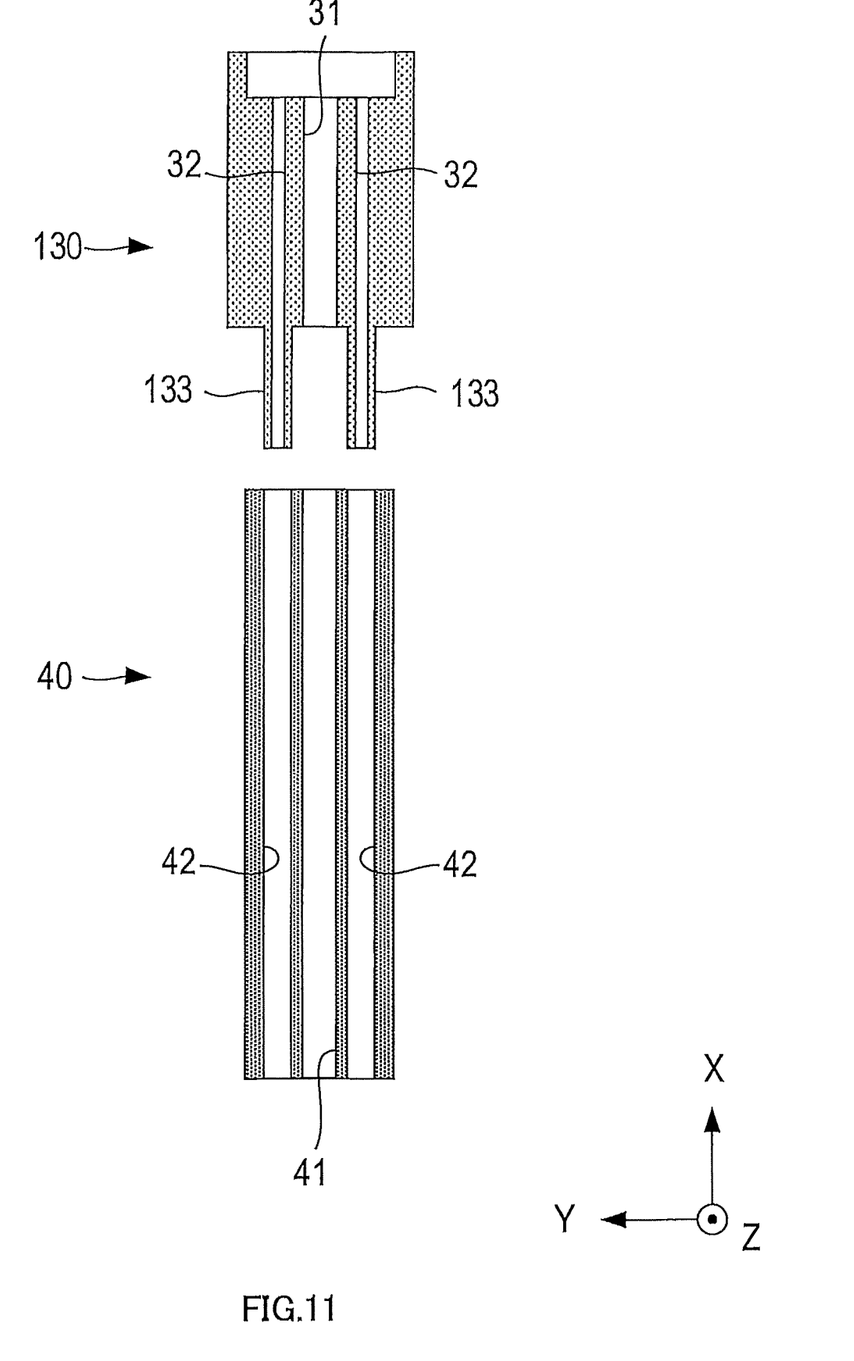
FIG. 11 is a schematic sectional view illustrating a configuration of a first insulating portion and a second insulating portion of FIG. 10.

Note that in the aforementioned embodiment, the first insulating portion 30, the second insulating portion 40, and the insulating pipe 50 are formed separately. However, as shown in FIG. 10 and FIG. 11, a first insulating portion 130, in which the first insulating portion 30 and the insulating pipe 50 are formed integrally, may be used. Alternatively, the second insulating portion 40 and the insulating pipe 50 may be formed integrally.

In a surgical instrument 101 shown in FIG. 10 and FIG. 11, the first insulating portion 130 is different from the surgical instrument 1 but the other components are unchanged. Two projecting portions 133 projecting toward the second insulating portion 40 are formed on a surface of the first insulating portion 130 facing the second insulating portion 40. Note that the first insulating portion 130 provided with the two projecting portions corresponds to one example of the projecting insulating portion.

More specifically, the two projecting portions 133 are each formed to have an outer shape that can be inserted into the second wire through hole 42. The two projecting portions 133 are located at positions facing the two second wire through holes 42 respectively. The second wire through hole 42 is a circular hole, and the projecting portion 133 is formed into a columnar shape having an outer diameter equal to or smaller than an inner diameter of the second wire through hole 42. The projecting portion 133 includes the first wire arrangement hole 32, in which the driving wire 70 is inserted such that the driving wire 70 can move in the X-axis direction.

In the case of the surgical instrument 101 having the above-described configuration, the two projecting portions 133 corresponding to the insulating pipes 50 are integrally formed in the first insulating portion 130, thereby reducing the number of parts compared to the case where the first insulating portion 30, the second insulating portion 40, and the two insulating pipes 50 are formed separately.

The technical scope of the present disclosure is not limited to the above-described embodiments, but may be modified in various ways within a range not departing from the subject matter of the present disclosure. For example, in the above-described embodiments, the surgical instrument body 20 is the forceps; however, the present invention can also be applied to other surgical instruments used in endoscope operations such as electric scalpels.

The invention claimed is:

1. A surgical instrument for a surgical assist robot, the surgical instrument comprising:
   a cable member having conductivity and formed into a cable-like shape;
   an outer shell having a shape covering a circumference of the cable member and having conductivity;
   a first insulating portion arranged in at least a part of a space between the cable member and the outer shell, wherein the first insulating portion is made of a material having a higher insulation property than a material of the cable member and a material of the outer shell;
   a second insulating portion arranged at a position, which exists between the cable member and the outer shell and which is adjacent to the first insulating portion, wherein the second insulating portion is made of a material having a higher insulation property than the material of the cable member and the material of the outer shell;
   a projecting portion projecting from a projecting insulating portion, which is one of the first insulating portion and the second insulating portion, toward a recessed insulating portion, which is the other of the first insulating portion and the second insulating portion, wherein the cable member is inserted into the projecting portion;
   a recessed portion formed in the recessed insulating portion, wherein the projecting portion is inserted into the recessed portion;
   a leading end portion arranged to be separated from the recessed insulating portion and the outer shell, wherein the leading end portion has conductivity and is bendable using tension of the cable member, of which an end portion is connected to the leading end portion; and
   a power supply cable, which is a member having a cable-like shape and which is arranged inside the first insulating portion and the second insulating portion, for supplying an electric power from an outside of the surgical instrument to the leading end portion,
   wherein the first insulating portion comprises a region, on a leading end portion side, forming an outer wall of the surgical instrument and a region, on an opposite side of the leading end portion side, arranged inside the outer shell.

2. The surgical instrument for the surgical assist robot according to claim 1, wherein the projecting insulating portion includes a recessed insertion portion, into which the projecting portion is inserted.

3. The surgical instrument for the surgical assist robot according to claim 2, wherein the recessed portion is a through hole provided in the recessed insulating portion, and the cable member is arranged in the through hole.

4. The surgical instrument for the surgical assist robot according to claim 1, wherein the projecting portion is formed integrally with the projecting insulating portion.

5. The surgical instrument for the surgical assist robot according to claim 4, wherein the recessed portion is a through hole provided in the recessed insulating portion, and the cable member is arranged in the through hole.

6. A surgical instrument comprising:
two driving wires;
a conductive shaft, surrounding a portion of each of the two driving wires;
a first insulator including a first portion that forms a portion of an outer wall of the surgical instrument and a second portion between the two driving wires and the conductive shaft;
a second insulator between the two driving wires and the conductive shaft, the second insulator being adjacent to the first insulator in an axial direction;
two insulating pipes, each having a first end inserted into the first insulator and a second end inserted into the second insulator, the two driving wires extending respectively through the two insulating pipes;
a surgical instrument body configured to be actuated by the two driving wires; and
a power supply cable extending through the first insulator and the second insulator, for supplying electric power to the surgical instrument body.

7. The surgical instrument according to claim 6, wherein each of the first insulator and the second insulator have an insulation property that is higher than an insulation property of the two driving wires and an insulation property of the conductive shaft.

8. The surgical instrument according to claim 6, wherein the first insulator comprises two insertion portions, and the first ends of the two insulating pipes are partially inserted respectively into the two insertion portions.

9. The surgical instrument according to claim 8, wherein the second insulator comprises two recessed portions, and the second ends of the two insulating pipes are partially inserted respectively into the two recessed portions.

10. The surgical instrument according to claim 6, wherein the surgical instrument body comprises:
a joint configured to bend according an actuation of the two driving wires;
a forceps coupled to the power supply cable and supported by the joint; and
an insulating cover that includes an opening through which a portion of the forceps projects.

11. The surgical instrument according to claim 6, wherein a first length of each of the first ends of the two insulating pipes that is inserted into the first insulator is equal to a second length of each of the second ends of the two insulating pipes that is inserted into the second insulator.

12. The surgical instrument according to claim 11, wherein the first length and the second length prevent high frequency current from flowing between the conductive shaft and the two driving wires.

13. A surgical tool comprising:
a power supply cable;
a first insulator coaxially surrounding the power supply cable, a portion of the first insulator forming a portion of an outer wall of the surgical tool;
a second insulator coaxially surrounding the power supply cable, the second insulator provided proximal to and contacting the first insulator;
a surgical instrument body provided on a distal end of the first insulator and configured to receive power from the power supply cable;
a conductive shaft coaxially surrounding the second insulator and a portion of the first insulator;
two insulating pipes, each having a first end inserted into the first insulator and a second end inserted into the second insulator; and
two driving wires extending through the first insulator, through the second insulator, and respectively through the two insulating pipes and connected to the surgical instrument body for operating the surgical instrument body.

14. The surgical tool according to claim 13, wherein the surgical instrument body comprises a forceps or an electric scalpel.

15. The surgical tool according to claim 13, wherein a portion of the first insulator separates the surgical instrument body from the conductive shaft such that the surgical instrument body is insulated from the conductive shaft.

16. The surgical tool according to claim 13, further comprising a cartridge including a pneumatic actuator connected to the two driving wires, and a power source connected to the power supply cable,
wherein each of the two driving wires comprises:
a conductive wire connected to the surgical instrument body;
a first conductive transmission rod connected to the conductive wire;
a second conductive transmission rod connected to the cartridge; and
an insulating body connected to the first conductive transmission rod and the second conductive transmission rod to insulate the first conductive transmission rod from the second conductive transmission rod.

17. The surgical tool according to claim 13, wherein the first insulator comprises two holes, and the first ends of the two insulating pipes are partially inserted respectively into the two holes in the first insulator.

18. The surgical tool according to claim 17, wherein the second insulator comprises two holes, and the second ends of the two insulating pipes are partially inserted respectively into the two holes in the second insulator.

19. The surgical tool according to claim 18, wherein a first length of each of the first ends of the two insulating pipes that is inserted into the two holes in the first insulator is equal to a second length of each of the second ends of the two insulating pipes that is inserted into the two holes of the second insulator.

20. The surgical tool according to claim 13, wherein the surgical instrument body comprises:
a joint configured to bend according an actuation of the two driving wires;
a forceps coupled to the power supply cable and supported by the joint; and
an insulating cover that includes an opening through which a portion of the forceps projects.

* * * * *